United States Patent [19]

Karibe et al.

[11] Patent Number: 4,854,079
[45] Date of Patent: Aug. 8, 1989

[54] WEATHER STRIP

[75] Inventors: Tamiharu Karibe, Yuki; Noboru Kunii, Utsunomiya, both of Japan

[73] Assignee: Nissan Motor Co., Ltd., Yokohama, Japan

[21] Appl. No.: 78,215

[22] Filed: Jul. 28, 1987

[30] Foreign Application Priority Data

Jul. 30, 1986 [JP] Japan ................................ 61-179474

[51] Int. Cl.[4] .............................................. E06B 7/16
[52] U.S. Cl. ........................................ 49/479; 49/498
[58] Field of Search .................. 49/479, 498; 285/286; 264/248, 259, 267

[56] References Cited

U.S. PATENT DOCUMENTS

| 1,700,319 | 1/1929 | Kjekstad | 285/286 |
| 2,264,586 | 12/1941 | Kuenzi | 49/479 |
| 2,571,259 | 10/1951 | Kusaik | 49/479 |

FOREIGN PATENT DOCUMENTS

| 2646058C2 | 5/1977 | Fed. Rep. of Germany . | |
| 56-116220 | 9/1981 | Japan . | |
| 0151233 | 9/1983 | Japan | 264/248 |
| 795154 | 5/1958 | United Kingdom . | |
| 796304 | 6/1958 | United Kingdom . | |
| 1435441 | 5/1976 | United Kingdom . | |
| 2061175 | 5/1981 | United Kingdom . | |

Primary Examiner—Kenneth J. Dorner
Assistant Examiner—Gerald A. Anderson
Attorney, Agent, or Firm—Foley & Lardner, Schwartz, Jeffery, Schwaab, Mack, Blumenthal & Evans

[57] ABSTRACT

A weather strip to be installed, for example, at the peripheral section of a door of an automotive vehicle. The weather strip is made of elastomeric material and comprised of a general section fabricated by extrusion and a molded section fabricated by molding. The general and molded sections are joined at their end portions with each other by so-called thermal fusion bonding thereby to form the weather strip into an elongated endless shape. The general section corresponds to a straight portion of the weather strip, whereas the molded section is generally L-shaped and corresponds to a curved corner portion of the same. Each of the general and molded sections includes a hollow sealing portion to be brought into contact with a seal-required door opening peripheral surface of a vehicle body. The inner surface of the sealing portion defines a hollow portion. Additionally, a bead is formed on the inner surfaces of the general and molded section hollow sealing portions in such a manner as to extend over the general and molded sections, thereby effectively increasing the strength of the weather strip at a joint section between the general and molded sections.

11 Claims, 4 Drawing Sheets

WEATHER STRIP

BACKGROUND OF THE INVENTION

1. Field of the Invention

The present invention relates generally to a weather strip to be installed to an openable and closable member such as a door or to the peripheral section of an opening of a vehicle body of an automotive vehicle in order to prevent penetration of water into a vehicle passenger compartment, and more particularly to such a weather strip formed by securely joining a general section fabricated by extrusion, and a molded section fabricated by molding.

2. Description of the Prior Art

In general, a weather strip has the same cross-sectional shape throughout its length and therefore is fabricated by extrusion. However, such fabriction by extrusion is impossible in a case where a weather strip includes a corner section of a larger curvature or a section in which the cross-sectional shape changes in the longitudinal direction of the weather strip. In this connection, such a section of the weather strip is required to be fabricated by molding, which has been put into practical use. The thus molded section is thereafter jointed with a general section fabricated by extrusion thereby to form an annularly elongated weather strip.

However, since joining between the molded section and the general section is usually made only by bringing them into contact with each other upon thermally partially fusing the end faces of them, the joining strength is low and therefore stable sealing ability cannot be obtained while offering the possibility of developing twist and breakage in the joint section between the molded section and the general section.

SUMMARY OF THE INVENTION

A weather strip according to the present invention is comprised of a general section made of elastomeric material and fabricated by extrusion. The general section includes a sealing portion which has an inner surface defining a hollow portion. A molded section made of elastomeric material and fabricated by molding is jointed at its end portion with an end portion of the general section by thermal fusion bonding. The molded section includes a sealing portion which has an inner surface defining a hollow portion. Additionally, a bead is formed on the inner surfaces of the sealing portions of the general and molded sections. The bead extends over the general and molded sections and is integral with the inner surfaces of the general and molded sections.

Accordingly, since the bead is formed extending over the general and molded sections in addition to jointing by the, thermal fusion bonding, joining strength between the general and molded sections is largely improved over the conventional weather strip. As a result, the joint section between the general and molded sections are prevented from its twist and breakage while effectively avoiding penetration of water into a vehicle passenger compartment. In addition, since such strength improvement in the joint section is accomplished merely by the bead, the joint section can be prevented from being hardened as compared with other sections, so that the sealing portion can be in smooth contact with the whole periphery of a seal-required surface under uniform contacting force, thereby obtaining a sufficient sealing ability.

DETAILED DESCRIPTION OF THE INVENTION

Figure 1:
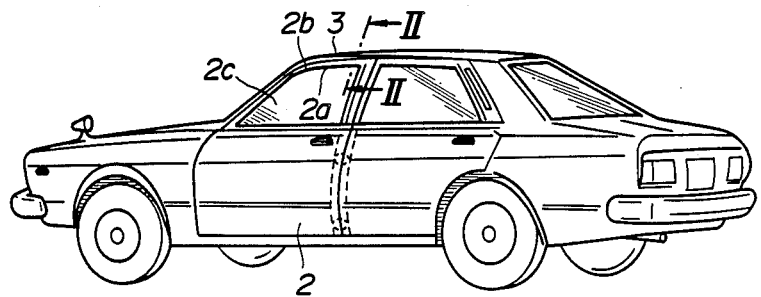
FIG. 1 is a perspective view of an automotive vehicle with a conventional weather strip at the periphery of a vehicle door.
Figure 2:
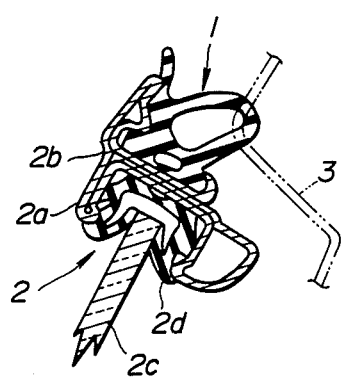
FIG. 2 is a fragmentary vertical cross-sectional view taken in the direction of arrows substantially along the line II—II of FIG. 1, showing the structure of the conventional weather strip.
Figure 3:
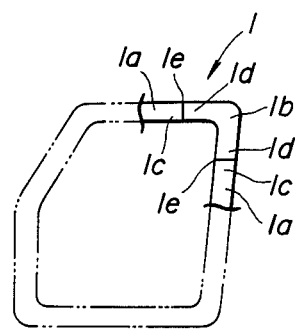
FIG. 3 is a front view of the weather strip of FIG. 2.

To facilitate understanding of the present invention, a brief reference will be made to a conventional weather strip, depicted in FIGS. 1 to 3. Referring to FIGS. 1 to 3, the conventional weather strip 1 is installed at the peripheral section 2a (a door sash 2b forming part of the peripheral section 2a in FIG. 2) of a door 2 of an automotive vehicle thereby to accomplish sealing between the door peripheral section 2a and a peripheral section 3 of a door opening of a vehicle body. As shown in FIG. 2, the door sash 2b is provided at its inner periphery with a sealing member 2d contactable with a movable door glass 2c thereby to maintain sealing between the door sash 2a and the door glass 2c when the door glass 2c is brought into contact with the sealing member 2d.

The weather strip 1 is made of elastomeric material and includes a general section 1a which is installed at a generally straight portion of the door peripheral section 2a and fabricated by extrusion. The end part 1c of the general section 1a is joined with the end part 1d of a molded section 1b which is installed at the corner portion of the door peripheral section 2a and fabricated by molding. Such a weather strip 1 is fabricated as follows: First the general section 1a is formed by extrusion, and thereafter the molded section 1b is molded and simultaneously bonded to the general section under heat of the material of the molded section 1b in such a manner that the general section end part 1c and the molded section end part 1d are joined to each other to form a joint section 1e.

However, difficulties have been encountered in the above-discussed weather strip 1, in which joining strength at the joint section 1e is less since the general section end part 1c and the molded section end part 1d are bonded merely upon being brought into contact with each other. As a result, it is difficult to bring the weather strip 1 into smooth contact with the whole vehicle body door opening peripheral section (sealing surface) 3 under uniform contacting force. This leads to the fact that no stable sealing can be accomplished while increasing the possibility of developing twist or breakage at the joint section 1e, thus lowering the quality of the weather strip 1.

Figure 4:
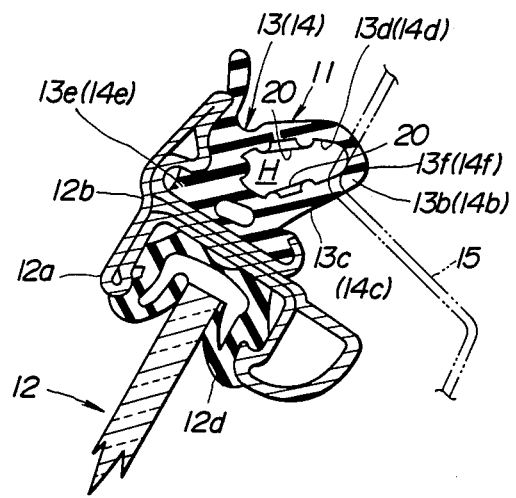
FIG. 4 is a fragmentary vertical cross-sectional view similar to FIG. 2 but showing an embodiment of a weather strip in accordance with the present invention.
Figure 5:
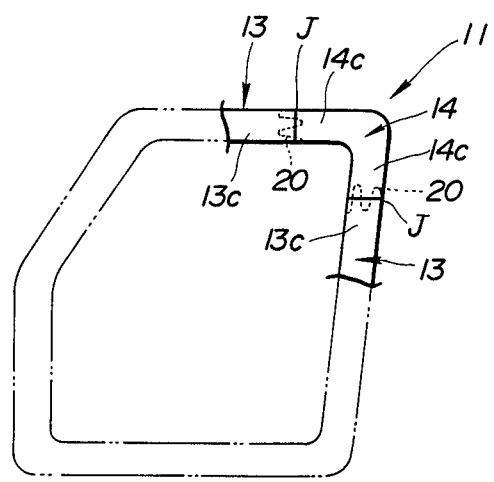
FIG. 5 is a front view of the weather strip of FIG. 4.

In view of the above description of the conventional weather strip 1, reference is now made to FIGS. 4 to 7, and more particularly to FIGS. 4 and 5, wherein an embodiment of a weather strip according to the present invention is illustrated by the reference numeral 11. The weather strip 11 is installed at the peripheral section 12a of a door 12 of an automotive vehicle like the conventional weather strip 1 as shown in FIGS. 1 to 3. The weather strip 11 is located along the whole periphery of the door 2 and therefore is finally formed as endless or generally annular as shown in FIG. 5. In FIG. 4, the weather strip 11 is secured to a door sash 12b forming part of the door peripheral section 12a. The door sash 12b is provided along its inside periphery with a sealing member 12d for maintaining sealing between a door glass 12 and the door sash 12b when the door glass 12 is brought into contact with the sealing member 12d.

The weather strip 11 is made of elastomeric material such as synthetic resin or synthetic rubber and comprised of a general section 13 and a molded section 14. The general section 13 is fabricated by extrusion and installed at a generally straight portion of the door peripheral section 12a, whereas the molded section 14 is fabricated by molding and installed at a corner portion of the door peripheral section 12a. The general section 13 and the molded section 14 are joined at their respective end portions 13c, 14c with each other to form a joint section J, so that the weather strip 11 is endless or generally annular as shown in FIG. 5. The joining between the general section end portion 13c and the molded section end portion 14c is accomplished by so-called thermal fusion bonding in which the end portions 13c, 14c are heated to partly fuse and bond to each other The general section 13 and the molded section 14 have generally the same cross-sectional shape as indicated in FIG. 4. Each of the general and molded sections 13, 14 includes a sealing portion 13b, 14b integral with a base portion 13e, 14e secured to the door peripheral section 12a. The sealing portion 13e, 14e is formed hollow and adapted to be brought into press contact with a door opening peripheral section 15 of a vehicle body when the door 12 is closed. The sealing portion 13b, 14b has an inner surface 13d, 14d defining a hollow portion H, and an outer surface 13f, 14f which is brought into contact with the door opening peripheral section 15.

Figure 6:
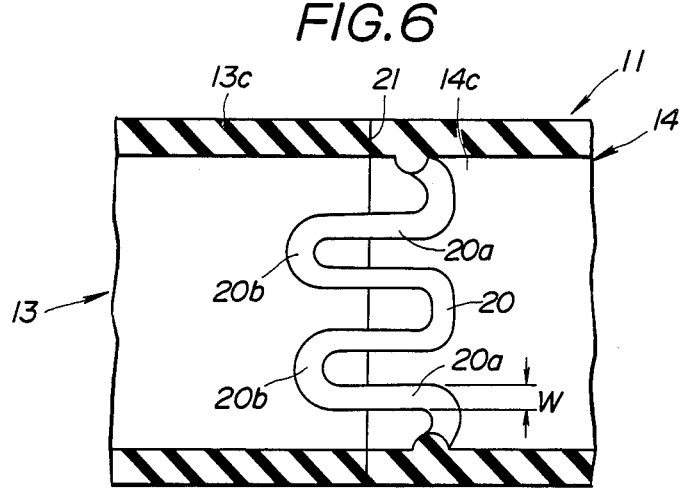
FIG. 6 is a fragmentary vertical cross-sectional view of a joint section between general and molded sections of the weather strip of FIG. 4, showing the inner surface of the joint section.

As best shown in FIG. 6, a wave-like bead 20 is formed on the inner surface 13d, 14d at the joint section J between the general section end portion 13c and molded section end portion 14c, so that the bead 20 extends over the general section 13 and the molded section 4, crossing a parting plane 21 between the general and molded sections 13, 14. In this embodiment, the bead 20 is formed on the inner surface 13d (14d) of each of the adjacent or generally opposite flat walls of the sealing portion 13b (14b ) as shown in FIG. 4 thereby reinforcing the joint section J. In this connection, no such bead will be formed on the inner surface defining the base portion 13e, 14e. As shown in FIG. 6, the bead 20 includes a plurality of straight sections 20a extending in the longitudinal direction of the weather strip 11. The adjacent straight sections 20a are integrally connected with each other by a curved connecting section 20b located on the side of the general section 13. The adjacent straight sections 20a, 20a are, of course, connected with each other on the side of the molded section 14; however, the curved section 20b may not be used therefor. In this embodiment, the bead 20 has a width W of about 2 mm and a height of 0.5 mm from the inner surface 13d, 14d.

Figure 7:
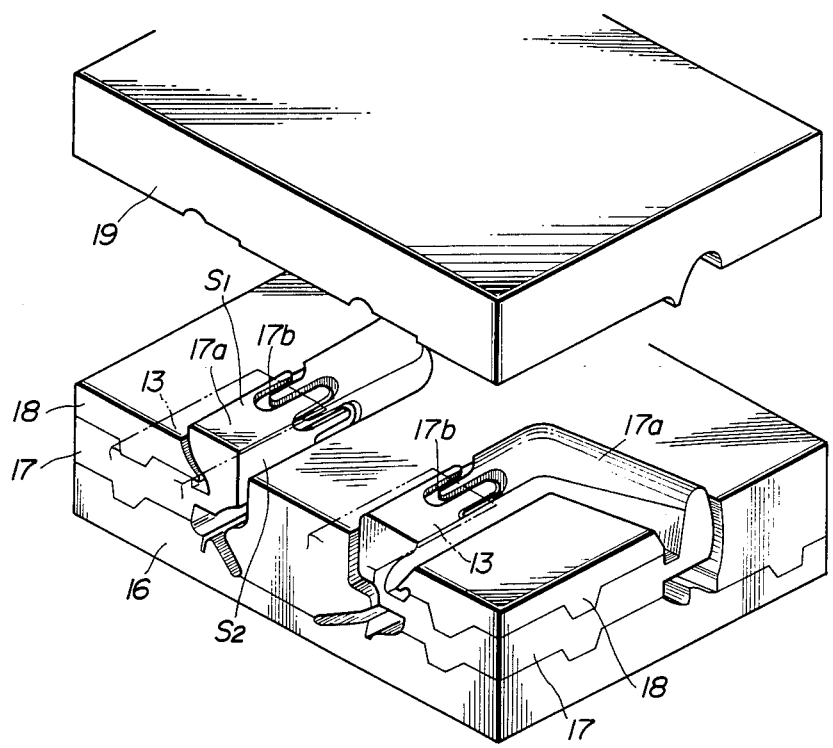
FIG. 7 is a perspective view of a mold arrangement used for fabrication of the weather strip of FIG. 4.

The weather strip 11 is fabricated as follows:

First the general section 13 is fabricated by extrusion. Next the molded section 14 is molded by using a mold arrangement as shown in FIG. 7. The mold arrangement consists of a lower mold 16, first and second cores 17, 18, and an upper mold 19. The first core 17 is provided with , a hollow forming section 17a for forming a hollow portion H of the molded section sealing portion 13b, 14b. The hollow forming section 17a is formed with a wave-like groove 17b for forming the bead 20 which groove 17b is formed at two adjacent faces $S_1$, $S_2$ of the section 17a. In molding the molded section 14 by using such a mold arrangement, the previously fabricated general section 13 is inserted into a position indicated in phantom in FIG. 7 so that the tip end of the general section 13 reaches a longitudinal center of the bead straight section 20a in such a manner that the hollow forming section 17a of the first core 17 e enters the hollow portion H of the general section 13. Thereafter, the upper mold 19 is joined to the lower mold 16 accompanying the first and second cores 17, 18. Then molten synthetic resin or rubber is injected into a cavity formed by the lower and upper molds 16, 19a and the first and second cores 17, 18. Accordingly, the molded section 14 is fabricated in which the molded section end portion 14c and the general section end portion 13c are bonded to each other by being partially fused upon heat of the molten resin or rubber thereby accomplishing the thermal fusion bonding. Simultaneously, the groove 17b of the first core hollow forming section 17a is filled with the molten resin or rubber, so that the bead 20 is formed on the inner surfaces 13d, 14d and located extending over the general and molded section 14 as shown in FIG. 6. It will be understood that the bead 20 is substantially integral with the inner surface 13d of the general section 13 since a part of the inner surface 13d corresponding to the bead 20 is fused under heat of the molten resin or rubber.

By virtue of the thus formed bead 20, the strength of the joint section J between the general and molded sections 13, 14 is improved over the conventional weather strip 1 without increasing steps in production. As a result, the weather strip 11 can be prevented from its bending, twist and breakage particularly at the joint section J between the general and molded sections 13, 14, thereby improving the quality thereof while effectively preventing penetration of water into a vehicle passenger compartment. Moreover, since the strength improvement of the joint section J is accomplished only by the bead 20 as mentioned above, the joint section J is not so hardened and therefore the weather strip 11 can be brought into smooth contact with the whole door opening peripheral section 15 under uniform contacting force thereby obtaining a sufficient sealing ability. Moreover, since the bead 20 is continuous in waveform, the joint section J between the general and molded sections 13, 14 is strong in resisting twist of the weather strip 11 as compared with a case where a plurality of separate beads are formed on the inner surfaces 13d, 14d at the joint section J. In addition, the bead 20 is formed inside the hollow sealing portions 13b, 14b, and therefore existence of the bead 20 never leads to deterioration in appearance, quality and in sealing ability.

Further by virtue of the formation of curved connecting section 20b of the bead 20, two-way or counter-flow passages for filling the molten resin or rubber into the groove 17b are formed, so that the bead 20 (the straight sections 20a) are securely formed while absorbing to some extent, error in a mold joining plane, even under a condition where the general section 13 is lower in temperature so that molten resin or rubber has difficulty flowing through the groove 17b on the side of the general section 13. Additionally, the curved connecting section 20b contributes to reducing the amount of deflection of the weather strip 11 thereby raising the strength against force collapsing the sealing portion 13b, 14b of the weather strip 11.

Figure 8:
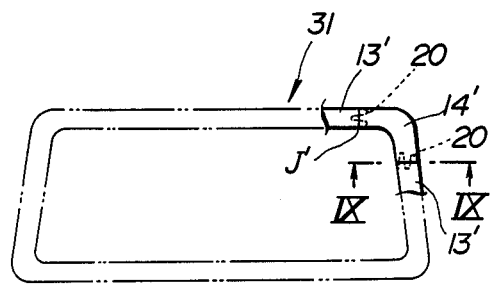
FIG. 8 is a front view of another embodiment of the weather strip in accordance with the present invention.
Figure 9:
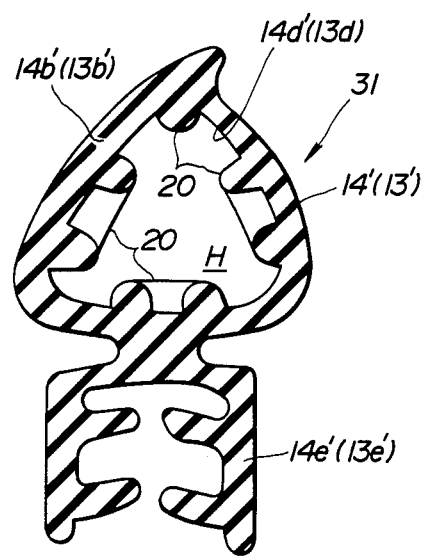
FIG. 9 is a cross-sectional view taken in the direction of arrows substantially along the line IX—IX of FIG. 8.

FIGS. 8 and 9 illustrate another embodiment of the weather strip 31 according to the present invention, which is similar to the weather strip 11 with the exception that the purpose thereof is other than sealing between the vehicle door and the vehicle body door opening peripheral section. In FIGS. 8 and 9, like reference numerals in FIGS. 4 and 5 designate like elements for the purpose of simplicity of illustration. Thus, the weather strip 31 of this embodiment is installed at the peripheral section of an opening formed in a vehicle body though not shown. More specifically, the weather strip 31 is comprised of the general section 13' and the molded section 14' which as, jointed at the joint section J' to be formed are endless or generally annular as shown in FIG. 8. The weather strip 31 includes the respective base portions 13e', 14e' of the general section 13' and the molded section 14' each of which base portions engages with a flange or edge portion of the vehicle body opening peripheral section in such a manner as to clip the flange section. The hollow portions 13b', 14b' are respectively integral with the base portions 13e', 14e'. The bead 20 is integrally formed on the inner surface 13d', 14d' at the joint section J' and located extending over the general and molded sections 13', 14'. The weather strip 31 is fabricated in a similar manner to that of strip 11 of FIGS. 4 and 5. As a result, the weather strip 31 can offer the same advantageous effect as in that of strip 11 of FIGS. 4 and 5.

While the bead 20 in the above-discussed embodiments has been shown and described as being wave-shaped, it will be appreciated that the bead may not be limited to the wave-shape and threfore may be linear.

What is claimed is:

1. A weather strip formed of bonded sections comprising:
   an extruded first section made of elastomeric material, said first section including a first sealing portion which has a first inner surface defining a first hollow portion in said first sealing portion;
   a molded second section made of elastomeric material, said second section including a second sealing portion which has a second inner surface defining a second hollow portion in the second sealing portion; and
   means for joining said first and second sections at end portions thereof by thermal fusion bonding to form a joint section, said means including a bead formed at said joint section and on the first and second inner surfaces of said first and second sections, said bead bridging said first and second sections, said bead being integral with said second inner surface and bonded to said first inner surface by thermal fusion bonding, said bead being formed during molding of said second section.

2. A weather strip as claimed in claim 1, wherein said first and second sections including first and second base portions, respectively, which are joined with each other by the thermal fusion bonding, said first base portion being integral with said first sealing portion, said second base section being integral with said second sealing portion, said first and second base portion being secured to a first rigid member, wherein said first and second sealing portions have first and second outer surfaces, respectively, which are to be in sealing contact with a second rigid member.

3. A weather strip as claimed in claim 1, wherein said first and second sealing portions are securely jointed with each other so that the first and second hollows are communicated with each other.

4. A weather strip as claimed in claim 1, wherein said first and second sections are joined to constitute a generally annular weather strip, wherein said first section serves as a generally straight portion of said weather strip, and said second section is a generally L-shaped a curved corner portion of said weather strip.

5. A weather strip as claimed in claim 1, wherein said bead includes a plurality of generally straight sections each of which extends over a parting plane between said first and second sections, and at least one curved connecting section for integrally connecting said straight sections.

6. A weather strip as claimed in claim 5, wherein said straight sections extend generally in longitudinal direction of said first section.

7. A weather strip claimed in claim 5, wherein said curved connecting section is located on said first section.

8. A weather strip as claimed in claim 1, wherein said bead is formed simultaneously with molding of said second section in which said thermal fusion bonding is made.

9. A weather strip formed of bonded sections, comprising:
   a first section having an outer surface, an inner surface defining a hollow portion, and an end;
   a second section having an outer surface, an inner surface defining a hollow portion, and an end, the first and second inner and outer surfaces and hollow portions being aligned; and
   means for bonding said first and second sections, said means including the first section end being bonded to the second section end, and a wave-like bead extending from the inner surface of the second section being bonded to the inner surface of the first section, the wave-like bead extending alternatingly across the bonded ends of the first and second sections.

10. A weather strip formed of bonded sections, comprising:
    an extruded first section having an outer surface, an inner surface defining a hollow portion; and an end;
    a molded second section having an outer surface, an inner surface defining a hollow portion, and an end, the first and second inner and outer surfaces and hollow portions being aligned; and
    means for bonding said first and second sections, said means including the first section end being bonded to the second section end when the second section is molded, and a wave-like bead molded with the inner surface of the second section bonded to the inner surface of the first section when the second section is molded, the wavelike bead extending alternatingly across the bonded ends of the first and second sections.

11. A method for producing a weather strip, comprising following steps:

fabricating a first section by extrusion of flowable elastomeric material, said first section including a first sealing portion which has a first end and a first inner surface defining a first hollow portion;

molding a second section with a mold being formed with a groove therein, said second section including a second sealing portion which has a second inner surface defining a second hollow portion, a first part of said mold groove corresponding to a first bead portion formed at said second inner surface of said second section;

putting said first section first sealing portion including said first end in said mold in a manner such that said first inner surface, including said first end, covers a second part of said mold groove, said second part of said groove being contiguous with said first part of said groove and corresponding to a second bead portion adjacent said first inner surface of said first section;

feeding flowable elastomeric material into said mold cavity and said groove to mold said second section and said first and second bead portions, whereby said second section is molded and simultaneously, said second section is bonded to said first end of said first section and said second bead portion is bonded to said first inner surface of said first section.

* * * * *